UNITED STATES PATENT OFFICE.

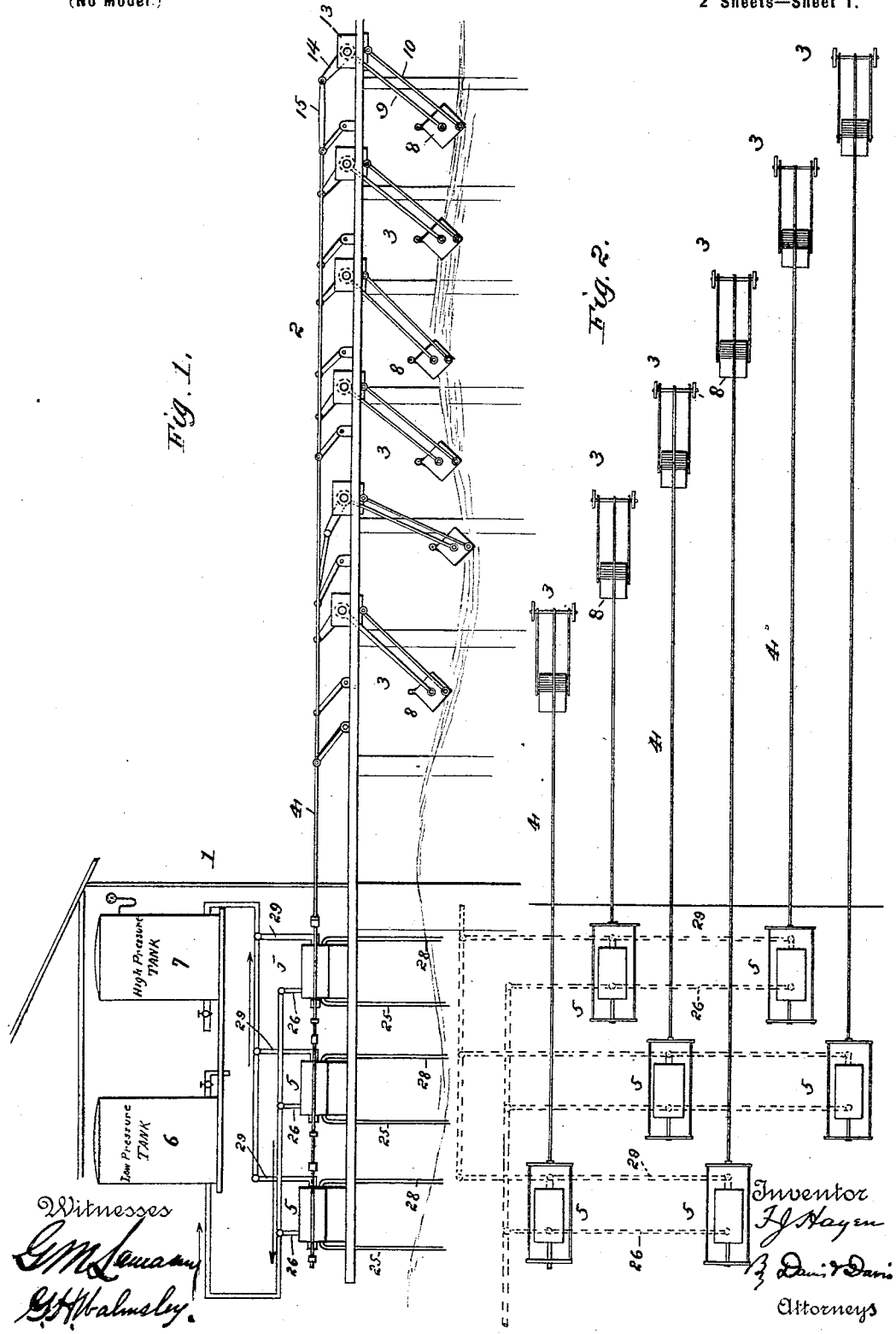

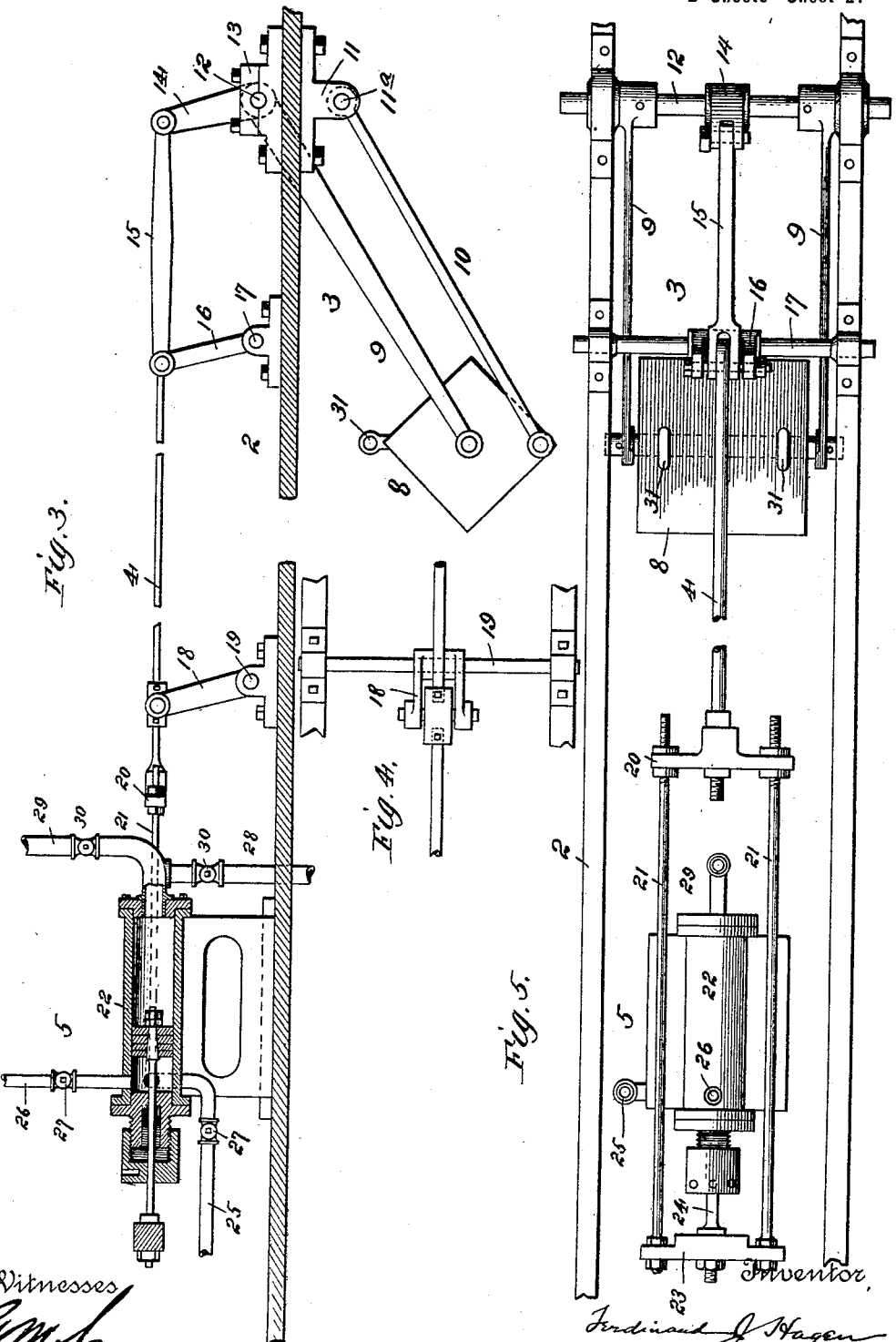

FERDINAND J. HAGEN, OF NEW YORK, N. Y., ASSIGNOR OF ONE-HALF TO BENJAMIN H. HOMAN.

WAVE-POWER.

SPECIFICATION forming part of Letters Patent No. 625,444, dated May 23, 1899.

Application filed March 4, 1899. Serial No. 707,709. (No model.)

*To all whom it may concern:*

Be it known that I, FERDINAND J. HAGEN, a citizen of the United States, residing in the borough of Manhattan, city of New York, and State of New York, have invented certain new and useful Improvements in Wave-Powers, of which the following is a specification, reference being had therein to the accompanying drawings.

The object of this invention is to provide a simple apparatus for utilizing to a maximum degree the power of the waves of the ocean or other natural body of water, as more fully hereinafter set forth.

Figure 1 is a side elevation of my apparatus; Fig. 2, a diagram of a plan view thereof; Fig. 3, a vertical section, partly in side elevation, of one of the motors and connected pump; Fig. 4, a detail plan of the devices for supporting the pump-rod, and Fig. 5 a plan view of Fig. 3.

Referring to the drawings by numerals, 1 designates the main structure, which may be a building of any sort and which may be erected at the edge of or in a suitable natural body of water, and projecting from this structure out into the ocean or other body of water is a pier 2, upon which is supported a series of independent wave-powers 3, each of which is connected by suitable pitman 4 to an independent pump 5, each pump being connected to a low-pressure tank 6 and a high-pressure tank 7, suitably arranged in the main building 1.

Each wave-power consists of a float 8 of substantially rectangular shape and supported upon the surface of the water by means of a pair of arms 9 and a pair of links 10, the former being pivoted at their lower ends centrally to the ends of the float and the latter (the links) having their lower ends pivoted to the ends of the float near its lower edge. The links and arms extend upward and outward—that is, in a direction toward the outer end of the pier—the upper ends of the links being pivoted to brackets 11 on the under side of the frame or floor of the pier and the arms 9 being rigidly attached to a shaft 12, journaled in bearings 13, supported on the pier, said shafts 11ª and 12 running transversely of the pier and parallel to each other. Rigidly attached to shaft 12 is an upward-projecting arm 14, which is pivotally connected by a link 15 to the upper end of a pivotal support 16, pivotally supported by means of a transverse shaft 17, journaled upon the pier in parallelity with the shaft 12. Extending from the link 15 inward to near the pump is the above-mentioned pump-rod 4, which is pivotally supported at suitable points by means of arms 18, carried by transverse shafts 19, journaled on the pier and lying parallel with the other shafts 17 and 12. This rod 4 is connected by a cross-bar 20 to a pair of parallel screw-rods 21, extending to the rear of the pump-cylinder 22 on either side thereof, the rear ends of rods 21 being connected to another cross-bar 23, centrally of which is connected the piston-rod 24, which enters the cylinder through a suitable stuffing-box in the rear end thereof. Entering the rear end of the cylinder are an eduction-pipe 26 and an induction or suction pipe 25, each of these pipes being provided with a suitable check-valve 27. Entering the forward end of the cylinder are an induction-pipe 28 and an eduction-pipe 29, each of these pipes being also provided with a suitable check-valve 30. The suction-pipes of the several pumps are connected to the ocean or to a suitably-located tank of fresh water, and the eduction-pipes 26 are connected together and to the low-pressure tank 6, and the eduction-pipes 29 are connected together and to the high-pressure tank 7.

The operation of each wave-power is apparent. The incoming waves lift the float and force the pump-piston forward, and as the float descends into the troughs of the waves the piston is moved backward, each stroke of the piston forcing water into the tanks against the pressure of air therein. The greater force is exerted by the lifting action of the waves, and this force is utilized to keep up the pressure in the high-pressure tank, while the lesser force obtained from the descending float is utilized to keep up the pressure in the low-pressure tank. The object in working the pump-piston through the rear end of the pump-cylinder is to avoid using a stuffing-box at the high-pressure end of the cylinder, which feature contributed materially to the practicability of the apparatus. The object in supporting the float by inward-extending arms is to have the float rise with the waves—that is, upward and inward in the direction of their movement—and not against them, as would be the case were the float carried by arms extending outward against the incoming waves. This is a very essential feature, as it avoids a great amount of friction and strain, utilizing to the maximum degree the lifting power of the waves.

I prefer using a number of independent motors and pumps and arranging them in an oblique series with reference to the normal line of movement of the waves, the row of motors being sufficiently long to extend across waves of normal width, the object of which is to provide for a continuous supply of water to the tanks, it being evident that with this arrangement there will at all times be an upward movement of one or more of the floats and a descending movement of the remaining floats.

Each float may be provided with an eye 31, whereby it may be lifted out of the water, and may consist of an air-tight box or a suitable casing inclosing cork or other buoyant material.

I claim—

1. In a wave-power, the combination of a pump, a support, a float, a pair of arms carrying the same, a transverse shaft journaled on the support and connecting said arms, one or more similar shafts journaled on the support between the first-mentioned shaft and the pump, a series of upright arms, one carried by each shaft, means pivotally connecting the upper ends of said upright arms, and a pump-piston and rod connected to said means, for the purpose set forth.

2. In a wave-power, the combination of a pump, a piston-rod entering the rear end thereof, a pump-rod connected to said piston-rod, and a rising-and-falling float connected to said pump-rod, the rising movement of the float forcing the piston-rod forward and its falling movement moving the piston backward, a high-pressure pipe connected to the forward end of the pump-cylinder and a low-pressure pipe connected to the rear end of the cylinder, for the purposes set forth.

3. The combination of a support, a float, a pair of pivotal supporting-arms connected thereto, a pair of pivotal supporting-links also connected to the float, the links and arms extending upward and outward in a direction from which the waves normally come, a transverse shaft connecting the upper ends of the arms, an upward-extending arm carried by said shaft, a link connected to said arm, an additional transverse shaft journaled on the support and carrying an upward-extending arm connected to said link, an inward-extending pump-rod, means for supporting it at suitable points, and a pump connected to said rod, substantially as set forth.

In testimony whereof I hereunto affix my signature, in the presence of two witnesses, this 27th day of February, 1899.

FERDINAND J. HAGEN.

Witnesses:
JOSEPH KURTZ,
C. WILLIAM WIDMAYER.